United States Patent [19]

Rylander

[11] Patent Number: 4,851,016
[45] Date of Patent: * Jul. 25, 1989

[54] DEVICE FOR FILTERING A STREAM OF AIR

[76] Inventor: Roland Rylander, 19 Deep Hollow Rd., Chester, Conn., 2

[*] Notice: The portion of the term of this patent subsequent to Dec. 27, 2005 has been disclaimed.

[21] Appl. No.: 287,914

[22] Filed: Dec. 21, 1988

Related U.S. Application Data

[63] Continuation-in-part of Ser. No. 170,838, Mar. 21, 1988, Pat. No. 4,793,835.

[51] Int. Cl.⁴ .............................................. B01D 53/14
[52] U.S. Cl. ...................................... 55/228; 55/248; 261/120
[58] Field of Search ............... 55/85, 86, 89, 95, 228, 55/242, 244, 248, 250, 315, 472, DIG. 3; 261/120

[56] References Cited

U.S. PATENT DOCUMENTS

| | | | |
|---|---|---|---|
| 3,676,982 | 7/1972 | Price | 55/95 |
| 3,778,978 | 12/1973 | Matsushita | 261/120 X |
| 3,812,370 | 5/1974 | La Violette | 55/244 X |
| 3,815,328 | 6/1974 | Moss | 55/244 X |
| 4,304,739 | 12/1981 | Thorne | 261/120 X |
| 4,578,253 | 3/1986 | Gill et al. | 55/228 X |
| 4,793,835 | 12/1988 | Rylander | 55/85 |

Primary Examiner—Charles Hart
Attorney, Agent, or Firm—William W. Jones

[57] ABSTRACT

The device directs a stream of air onto the top surface of a supply of water contained in a tank. The air is directed onto the water by a diffuser so as to create a turbulence on the surface of the water. The diffuser comprises a plenum which hovers over the water surface as a result of the air flow therethrough. The plenum is formed with a buoyant skirt which allows the plenum to float in the water when there is no air flowing through the plenum. The air leaving the water tank is thus moisturized. The device can be used to remove fibrous contaminants such as asbestos from the air, or can be used as an air humidifier, or the like.

1 Claim, 2 Drawing Sheets

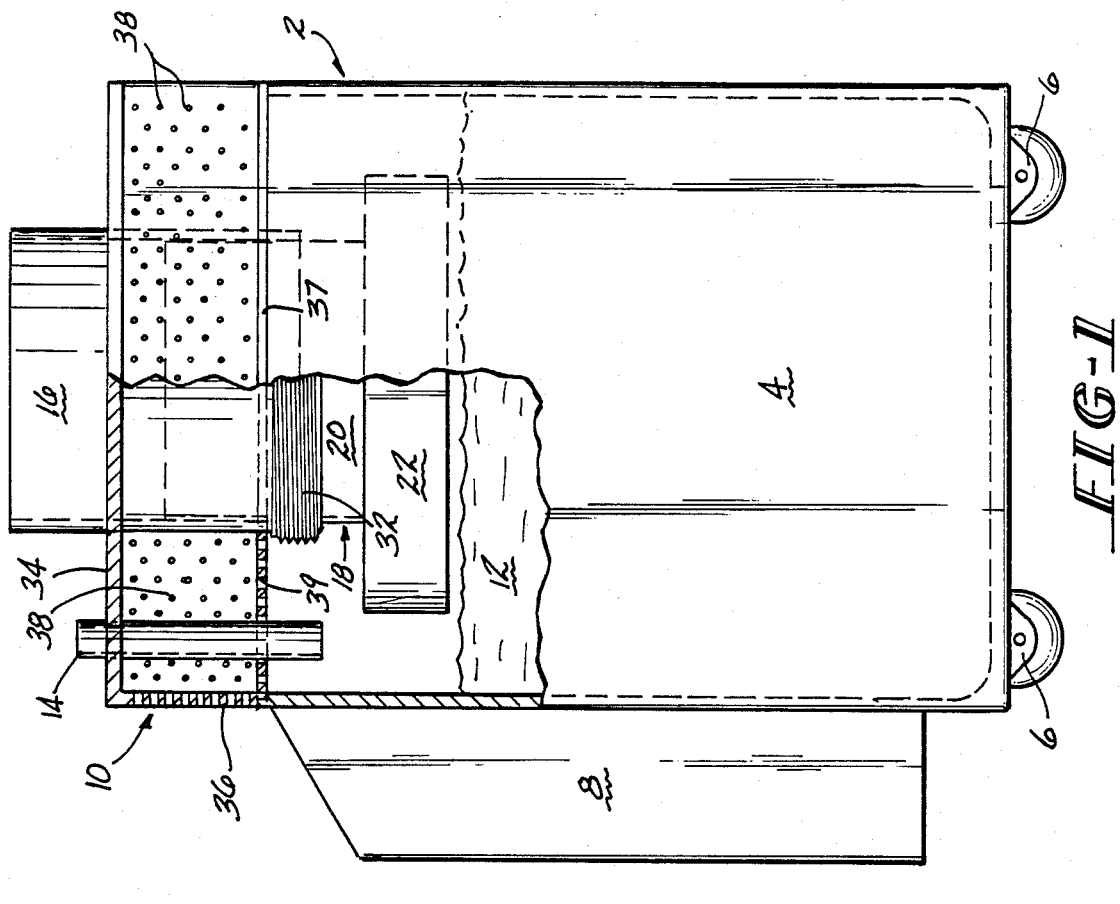
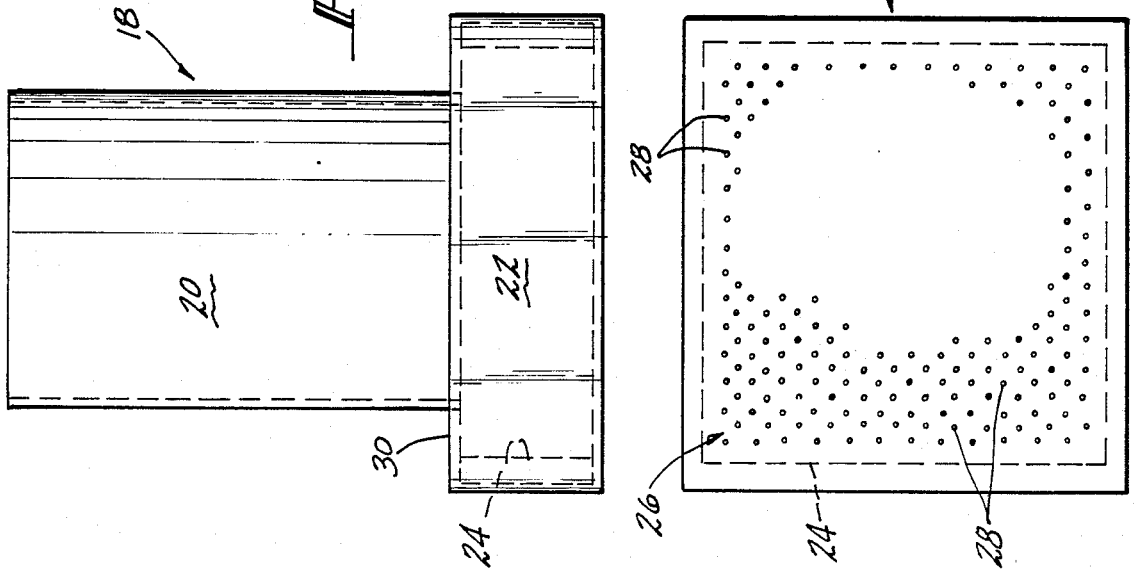

DEVICE FOR FILTERING A STREAM OF AIR

This is a continuation-in-part of copending U.S. Application Ser. No. 170,838, filed Mar. 21, 1988, now U.S. Pat. No. 4,793,835, granted Dec. 27, 1988.

This invention relates to a device for humidifying a stream of air, and more particularly to such a device which can be used to filter asbestos or the like fibrous contaminents from the air during the removal of asbestos-containing materials from buildings.

Much attention, and a great deal of effort, are being directed to the removal of asbestos from older buildings today. The use of asbestos was very widwspread in the building industry prior to 1972. The asbestos was incorporated into buildings for the purpose of fire proofing, sound proofing, insulating, and the like. Due to the more recent discovery that asbestos is hazardous to the health when airborn, and the knowledge that the asbestos in older buildings can be found in the air as microscopic fibers due to decay of the asbestos components in the structure, there is a widespread movement ongoing to remove asbestos from older structures. Strict government regulations have been enacted to insure that asbestos removal is carried out under conditions which do not endanger the workers involved, the remainder of the structure, and the ambient surroundings.

Regulations currently in force require that asbestos removal be performed in completely enclosed segments. For example, if a building is to be cleared of all of its asbestos components, an area being cleared must be surrounded by a protective sheathing, such a polyethylene "tent". In addition, the enclosed work area is required to be maintained in a negative air pressure condition with respect to the other parts of the structure outside of the work area, and the ambient surroundings. The negative pressure requirement is needed to continuously filter asbestos fibers that may become airborn during the removal operation. The air inside of the work area is continuously pumped out of the work area by a powered high efficiency particulate air (HEPA) filter. The air stream is directed through a filtering system which removes asbestos fibers from the air. The filtered air is then exhausted from the work area into the ambient outside surroundings, outside of the building. The fans for these negative pressure systems have air handling capacities of 1,000 to 2,000 cubic feet per minute, under clean filter conditions. Larger capacity fans can be used for large scale abatement projects. Whenever possible, and in some states it is mandated, the exhaust from the depressurization system is vented to ambient outdoor surroundings. This is a present requirement even though the filters will remove about 99.9% of all airborn fibers. It is a safety precaution which ensures that the other portions of the structure will not be subjected to a continuous stream of air contaminated with even dilute concentrations of asbestos fibers. The precaution also ensures that there will be no interior contamination in the event that the filters should become dislodged or damaged. U.S. Pat. No 4,601,111, issued Aug. 5, 1986 to Natale discloses a decontamination system of the type described above.

It will be readily appreciated that the requirement to discharge into the ambient outdoor environment is quite burdensome, and can create many problems. For example, if the structure being cleared is a large structure, such as a hospital, factory, or the like with a great many interior rooms, excessively long exhaust ducts will have to be used. These ducts will have to be run through other rooms outside of the work area, resulting in inconvenience at least in the other rooms. Another drawback to the outside venting requirement relates to the maintenance of appropriate temperatures inside of the building being cleared of asbestos. During extreme outside ambient temperature conditions, such as occur in winter or summer, when air is being exhausted continuously, and in the amounts noted above, the result is to bring the temperature inside of the building toward the temperature outside of the building. Thus, the entire building will tend to be cooled in winter and heated in summer by the need to vent to the outside. It is thus readily apparent that it would be highly desirable to be able to vent to exhaust from the fans inside of the building.

This invention relates to a device which can be used in conjunction with the air impeller and filter described above and will enable the exhaust from the system to be vented inside of the structure being renovated, and even inside of the sealed-off work area. Use of the invention will eliminate the exensive vent ducting required with the prior art, and can also eliminate the need to include air inlet circulation ducting into the sealed work area. The device of this invention will perform a further filtering of the air stream exhausted from the impeller fan and primary filter combination of the prior art, and will also be vented in a very diffuse manner, so that it can be placed inside of the work area and will not harmfully disturb the air inside of the work area. This is important because air turbulence in the work area increases the amount of asbestos fibers which are airborn in the work area.

The device of this invention includes a housing in which there is a water tank which holds a suitable amount of water. The water is used to wet the air exhausted from the fan and filter so that any asbestos fibers which were not captured by the filters, and are entrained in the exhaust, will be wetted and will fall into the water in the tank. The device also includes an air inlet tube which is connected to a conduit from the fan and filter assembly. A diffusing plenum member is disposed inside of the housing to receive the air inletted via the inlet tube. The plenum member is disposed above the water in the water tank, and includes a buoyant skirt of urethane, or the like, so that the plenum member will float on the water when the device is not being used. When the device is in use, air is diffused from the plenum member through a perforated bottom wall thereof which overlies the top surface of the water. This causes the plenum member to hover above the water surface on an air cushion. The exhaust stream is thus blown down onto the water causing a surface turbulence in the water tank. The diffused air stream is thus humidified, and any asbestos fibers entrained therein will be wetted. The wetted fibers will then settle into the body of water in the tank. The filtered and humidified air then is vented from the housing through an outlet diffuser. The use of an outlet diffuser ensures that the air in the area in which the device is used will not be disturbed by the exhaust from the device. Thus the device can be placed inside of the work area without creating the potential that undue agitation of asbestos will occur inside of the work area. The additional filtering of asbestos fibers from the exhaust from the fan-filter assembly also allows the device to be placed in other areas of the structure outside of the work area without creating a contamination potential. If necessary, the water supply in the tank can be continuously rid of asbestos fibers by being cycled through a filtration loop where microporous filters are used to cleanse the water of entrained fibers. To this end, water may be continuously pumped out of the water tank, through a filtering loop, and then back into the tank. When the decontamination job is finished, the water in the tank can be completely depleted of asbestos and then a drain valve can be opened to drain the cleansed water from the tank. In the event that the recycle filter becomes clogged, an audible alarm can be incorporated into the device to provide a warning that the recycle filters should be replaced. The device of this invention thus incorporates into the accepted system of the prior art an alarm which will indicate malfunction, an advantage which is not found in the prior art.

It is therefore an object of this invention to provide a device for humidifying a stream of air.

It is a further object of this invention to provide a device of the character described which is operable to filter fine fibrous contaminents, such as asbestos, out of the stream of flowing air.

It is another object of this invention to provide a device of the character described which operates with substantially no air turbulence caused by its discharge.

It is an additional object of this invention to provide a device of the character described which may be used to remove asbestos from interiors of structures without the necessity of creating a negative pressure in the work area of the structure.

These and other objects and advantages of the invention will become more readily apparent from the following detailed description of a preferred embodiment thereof when taken in conjunction with the accompanying drawings, in which:

FIG. 1 is a side elevational view of a preferred embodiment of a device formed in accordance with this invention, the view being partially cut away for clarity;

FIG. 3 is a side elevational view of the air inlet diffuser portion of the device; and FIG. 4 is a plan view of the bottom of the inlet diffuser of FIG. 3.

Figure 2:
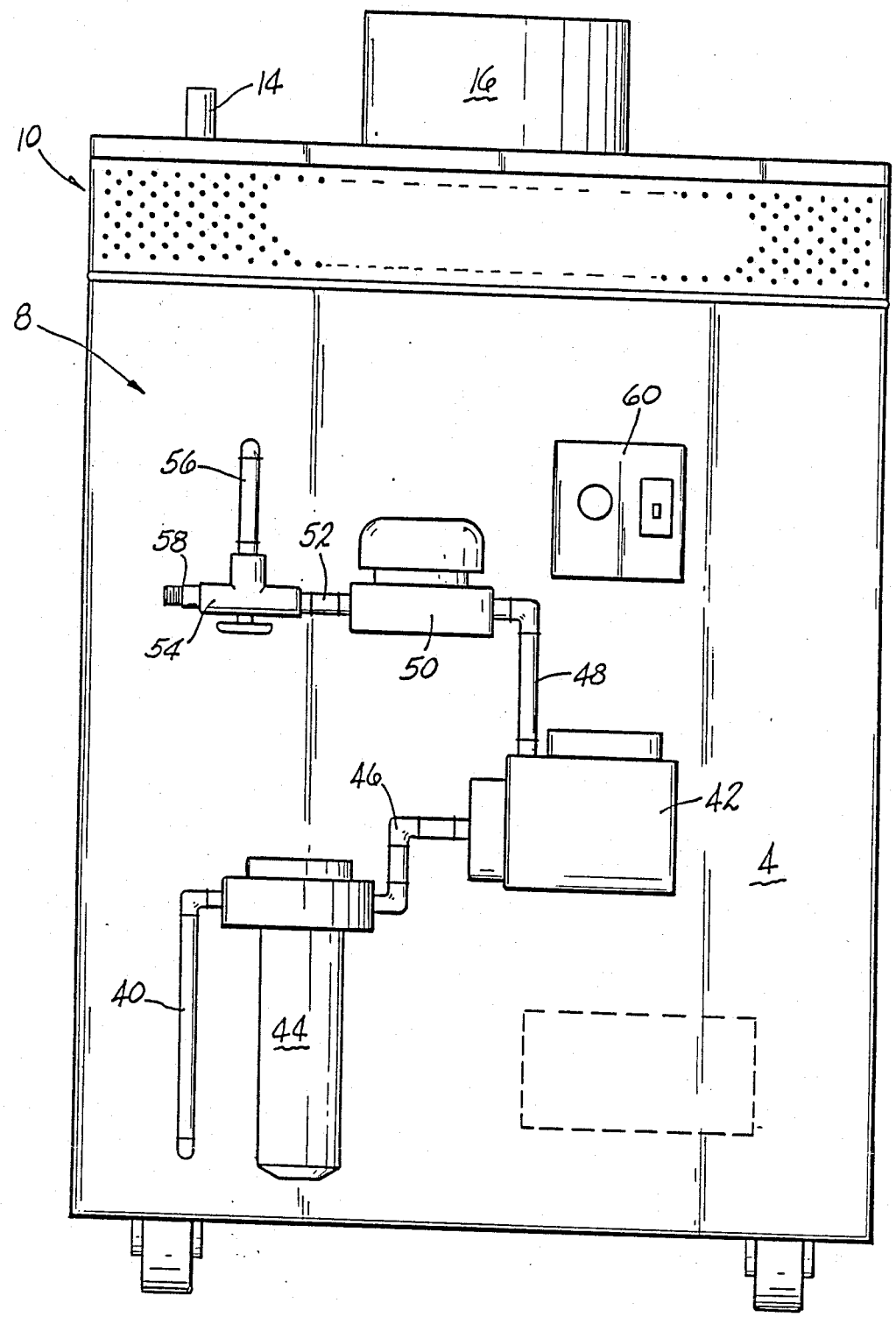
FIG. 2 is a side elevational view of the device of FIG. 1 as seen from the left side of FIG. 1 with the various plumbing and other auxiliary fixtures shown.

Referring now to the drawings, there is shown in FIG. 1 a preferred embodiment of a device, denoted generally by the numeral 2, which is formed in accordance with this invention, and which is particularly adapted for use in an asbestos removal system. The device 2 includes a tank 4 which is mounted on casters 6 so that it can be freely moved about. On the side of the tank 4, which is rectangular, is a cabinet 8 in which various plumbing, filtering and other peripheral components of the device are housed. The device 2 also includes a cover 10 which fits over and closes the tank 4. The cover 10 fits snugly on, and closes the tank 4, but can be removed therefrom. A predetermined volume of water 12 is disposed in the tank 4, the water 12 being placed in the tank 4 by means of a fill tube 14 mounted on the cover 10. A cylindrical air inlet tube 16 is mounted on the cover 10 and is operable to direct air to be humidified and decontaminated into the device 2. An air inlet diffuser 18 is disposed inside of the device 2. The diffuser 18 has a cylindrical throat 20 and a rectangular basal plenum member 22 secured to the throat 20.

As noted, in FIGS. 3 and 4 there is a layer 24 of buoyant material such as a resinous cellular foam adhered to the interior surface of the side walls of the inlet diffuser basal plenum member 22 which allows the inlet diffuser 18 to float on the water 12 when the device 2 is not being used. The bottom wall 26 of the air inlet diffuser 18 is formed with a plurality of small openings 28 therethrough, through which the air stream entering the device 2 is diffused onto the upper surface of the body of water 12 in the tank 4. The diameter of the openings 28 is about 5/32 inch and the openings are staggered about 5/16 diameters centers. The concentration of openings 28 in the bottom wall 26 is preferably 33 openings per in$^2$. The top wall 30 of the plenum member 22 is imperforate. The outside diameter of the cylindrical throat 20 is sufficiently smaller than the inside diameter of the inlet tube 16 so that the throat 20 can easily slide up and down in the inlet tube 16. A bellows type annular seal 32 seals the joint between the bottom of the inlet tube 16 and the outside surface of the throat 20.

FIG. 2 discloses details of the cover 10 and the components which are disposed in the cabinet 8. The cover 10 has an imperforate top wall 34 through which the water fill tube 14 and the air inlet tube 16 extend. The bottom of the cover 10 is open to the inside of the tank 4. The side wall 36 of the cover 10 is provided with a plurality of openings 38 sized as noted above and in generally the same concentration.

Disposed in the cabinet 8 is a water filtering and recirculation system which constantly removes water from the tank 4, filters the water to remove asbestos fibers therefrom, and then returns the filtered water back to the tank. The recirculation system includes a water removal conduit 40 which opens into the tank 4 near the bottom thereof. A water pump 42 in the recirculation system moves the water therethrough. The conduit 40 opens into a filter housing 44 in which an AMF CUNO brand water filter, Model No. AP101-S/AP101T (preferably) is disposed. The water filter is operable to remove asbestos filters five microns or larger in size from the water being recirculated through the recirculation system. Filtered water from the filter enters the pump 42 through conduit 46 and then flows through a conduit 48 to a flow switch 50. The water flow switch 50 is a device which is pressure sensitive, and is sold by McDonnell & Miller Div. of ITT Corporation. After leaving the flow switch 50, the water flows through a conduit 52 into a three way valve 54. The valve 54 will ordinarily be set to pass water into a return conduit 56 from whence the water reenters the tank 4. The valve 54 can be manually adjusted to pass the water into a drain fitting 58 which is used to drain the water from the tank 4 after finishing use of the device. An alarm 60 is included which emits an audible signal when the filter becomes clogged, or when the recirculation system stops functioning for any other reason, other than being intentionally shut down.

The device operates as follows. A source of pressurized air flow, such as a HEPA filtration fan is connected to the air inlet tube 16 by means of a flexible hose or the like. The air flow enters the plenum member 22 through the throat 20. As noted, when the device is started, the plenum member 22 will be floating on the water in the tank 4 by reason of the buoyant material 24. When the air pressure in the plenum member 22 rises due to the inflowing air from the HEPA fan, air begins to diffuse through the diffuser bottom wall 26 via the openings 28 in discrete jets directed onto the top of the water 12. This causes the air inlet diffuser 18 to rise above and hover over the top surface of the water 12. It also causes tubulance in the surface of the water so that considerable water vapor will form above the water's top surface. The air diffused through the diffuser 18 will thus become humidified, and any asbestos fibers entrained in the diffused, humidified air curtain will be thoroughly wetted and will then settle into the water rather than remaining suspended in the air stream. The asbestos which has settled into the water will be constantly drawn down to the bottom of the tank 4 and toward the water recirculation outlet pipe 40. Thus the asbestos fibers settling into the water 12 will be filtered out of the water in constant fashion. The humidified, asbestos-free air then flows upwardly toward the cover 10 and out of the device through the openings 38. The stream of air leaving the device is thus very diffuse, which results in little or no air turbulence or disturbance resulting in the environment in which the device is placed. This means that the outlet device of this invention can be positioned inside of the work area without creating air turbulence in the work area. Thus asbestos is not stirred up in the work area and rendered airborn by placing the device of this invention inside of the sealed work area. This is of course a very desirable feature of the invention.

It will be readily appreciated that when the device of this invention is used as an outlet component of an asbestos decontamination system, the result is that the complex air exhaust ductwork required in the negative pressure removal systems of the prior art can be eliminated, and the air inlet complex needed with the prior art negative system can likewise be eliminated. This is because the "negative pressure" work area is not needed in a system utilizing the outlet device of this invention. The outlet device of this invention also results in a "cleaner" air exhaust, i.e., an air exhaust which has less entrained asbestos than the negative pressure system of the prior art because the exhaust from the inlet fan/filter subsystem is further filtered by the device of this invention, whereas it is not further filtered in the negative pressure prior art system.

The plate 37 interposed between the water 12 and the perforated side wall 36 is provided with perforations 39 which help to reduce the amount of water which impinges the sidewall 36. This reduces the amount of water which may collect on the outside of the tank. This secondary water filter is preferred for use in the asbestos removal embodiment of the invention.

Since many changes and variations of the disclosed embodiment of the invention may be made without departing from the inventive concept, it is not intended to limit the invention otherwise than as required by the appended claims.

What is claimed is:

1. A device for removing particulate contaminants from ambient air, said device comprising:
    (a) a tank for holding a quantity of water;
    (b) a plenum member mounted above the water in said tank;
    (c) means for raising air pressure in said plenum member;
    (d) first diffuser means associated with said plenum member for creating a diffuse air stream of ambient air which air stream is directed downwardly toward the top surface of the water in said tank when air pressure in said plenum member is raised to elevate said first diffuser means above the top surface of the water in the tank, said diffuse stream of ambient air being operable to create sufficient surface turbulence in the water to wet particulate contaminants in the air stream whereby the wetted particulate contaminants will settle into the water;
    (e) second diffuser means for exhausting the humidified and decontaminated air from said device to ambient surroundings, whereby the exhaust from the device does not substantially disturb the air in the ambient surroundings; and
    (f) third diffuser means interposed between said first and second diffuser means for reducing the amount of water which impinges on said second diffuser means.

* * * * *